(12) United States Patent
Oks et al.

(10) Patent No.: US 7,689,607 B2
(45) Date of Patent: Mar. 30, 2010

(54) DATABASE PAGE MIRRORING

(75) Inventors: Artem Oks, Bellevue, WA (US); Hanumantha R Kodavalla, Sammamish, WA (US); Martin J Sleeman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 707 days.

(21) Appl. No.: 11/107,527

(22) Filed: Apr. 15, 2005

(65) Prior Publication Data

US 2006/0235909 A1    Oct. 19, 2006

(51) Int. Cl.
G06F 7/00 (2006.01)
G06F 17/30 (2006.01)
G06F 12/00 (2006.01)
G06F 13/00 (2006.01)
G06F 13/28 (2006.01)
G06F 11/00 (2006.01)

(52) U.S. Cl. .............. 707/648; 707/649; 707/655; 707/704; 711/162; 714/5; 714/6

(58) Field of Classification Search .................. None
See application file for complete search history.

(56) References Cited

U.S. PATENT DOCUMENTS

| 6,000,020 | A * | 12/1999 | Chin et al. ............. 711/162 |
| 6,289,357 | B1 * | 9/2001 | Parker ................... 707/202 |
| 6,721,739 | B1 * | 4/2004 | Mende et al. ............. 707/8 |
| 6,751,636 | B1 * | 6/2004 | Mende et al. ........... 707/200 |
| 6,859,811 | B1 * | 2/2005 | Chandrasekaran et al. .. 707/200 |
| 7,051,052 | B1 * | 5/2006 | Shapiro et al. ......... 707/204 |
| 2002/0042788 | A1 * | 4/2002 | Goralwalla et al. ...... 707/1 |
| 2005/0203974 | A1 * | 9/2005 | Smith et al. ........... 707/204 |

OTHER PUBLICATIONS

Simons et al. (WO/2004/021667) (published on Mar. 11, 2004).*

* cited by examiner

*Primary Examiner*—Charles Rones
*Assistant Examiner*—Harold A Hotelling
(74) *Attorney, Agent, or Firm*—Workman Nydegger

(57) ABSTRACT

Systems and methods are presented that facilitate automatic database backup and restore for databases resident in personal computing devices, and which are transparent to a user, utilizing database page mirroring. Modifications to a data page in a data file can be validated and written to a backup, or mirror, database and then subsequently written to an original database after a predetermined time. An I/O latch on a mirrored data page can be limited to a duration of a single I/O write operation to facilitate sequential data page writing to each of the databases while mitigating potential for both databases to be written simultaneously, which can detrimentally affect data quality during a recovery operation.

15 Claims, 13 Drawing Sheets

DATABASE PAGE MIRRORING

TECHNICAL FIELD

The subject invention relates generally to database management, and more particularly to automatically backing up and restoring databases resident upon consumer computing devices.

BACKGROUND OF THE INVENTION

Computers and computer-based devices have become a necessary tool for many applications throughout the world. Typewriters and slide rules have become obsolete in light of keyboards coupled with sophisticated word-processing applications and calculators that include advanced mathematical functions/capabilities. Thus, trending applications, analysis applications, and other applications that previously may have required a collection of mathematicians or other high-priced specialists to painstakingly complete by hand can now be accomplished through use of computer technology. To properly effectuate the aforementioned applications as well as other applications that utilize data within databases, such data must be accessible and be free from corruption. Businesses that have sufficient resources can employ one or more database administrators (DBAs) to ensure that data within a database remains available to users and/or applications accessing such database. For instance, a DBA can schedule a backup of data within the database in case of occurrence of corruption therein, and thereafter effectuate such backup. If problems exist within a first copy of the data (e.g., data therein is corrupted), the second copy of the data can be utilized to restore such first copy.

As can be assumed, DBAs are a significant expense with respect to database management. For instance, DBAs typically are associated with advanced and specialized skill in the field of databases. Accordingly, individual users do not employ DBAs to monitor their hard drives to ensure data integrity therein. Furthermore, many conventional computer systems are not associated with database engines—thus rendering DBAs useless in connection with such systems. As hard drive space has expanded, however, employing database technology in consumer-level computers (such as desktop computers, laptop computers, and the like) is becoming increasingly popular. Therefore, similar problems existent with respect to database servers (e.g., data corruption) are becoming prevalent with respect to consumer-level computers.

Given the above, it is apparent that individual users, small businesses, and any other user/entity not employing a DBA to manage their database(s) is subject to various catastrophes associated with data corruption. For instance, if particular pages within a database file are subject to corruption, and no adequate backup system exists, then an entirety of a database can be lost. For typical consumer users, this can translate to loss of information associated with banking accounts, information related to photographs, entertainment, and the like, and various other data that is extremely important to an individual. Furthermore, a user can manually enter at least a portion of data within a database, and it may have required a substantial amount of time for the user to provide this information. In one example, a user may have thousands of different music files resident upon a hard drive, and ratings associated with the music files may have been manually entered by a user and stored in a database. A substantial amount of time was obviously necessary to enter such ranking data, and loss of such data due to data corruption will negatively affect user enjoyment associated with the music files. With respect to small businesses, corruption of a database can equate to loss of payroll information, tax information, profitability data, and various other data that is of extreme importance to the business. Thus, a loss of a database due to corruption therein can prove disastrous to both consumer users and small business users.

Conventionally, as consumers and small businesses typically do not employ DBAs, the only manner in which to protect themselves is to manually create backups of a database. Many users do not undertake such backups as they assume that their computers are not susceptible to data corruption. In other instances, a user may only sporadically remember to take a backup of an important database (e.g., once every few months). Therefore, even if such user does remember to backup the database, data within the backup may be obsolete in some respects. Moreover, if there is a corruption within data, the user must then manually copy data from the backup of the database and enter such data into an "original" database, thereby providing even further opportunity for human error (e.g., copying data to an incorrect location).

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein relates to novel systems and methods for automated database backup and restore of databases in personal computing devices, such as a personal computer, a laptop, a personal digital assistant, a cellular phone, and the like. The systems and methods disclosed herein facilitate providing consumers with automated data backup functionality where conventional systems fall short by requiring manual data backup that can be tedious and prone to human error.

According to an aspect of the invention, an original database and/or data files therein can be completely duplicated and stored as a mirror database and/or data file. For example, a structured query language (SQL) database can be duplicated and stored resident on a personal computing device. When a user modifies data in a given data page in the original database, the data page can be imported to a buffer memory where modifications can be validated and modified pages can be written back to the original database as well as the mirror database. A lazy writer component can be employed to mitigate overcrowded buffer space while maintaining current page images in each of the original database and the mirror database. For example, if all pages in the buffer memory have been modified, they can require writing to disk before they can be evicted from the buffer memory. The lazy writer component can determine which pages can be evicted. For instance, unmodified pages can be evicted and modified pages can be written and then evicted. The lazy writer component can continuously and sequentially assess pages in the buffer memory and can be decremented for each pass made over a given page. Once a data page has been modified, the page can be written to the mirror database and, after a predetermined number of decrements, or passes, the page can subsequently written to the original database. Additionally, the invention facilitates reducing a duration of an input/output latch on mirrored page to the duration of a single input/output write operation.

According to a related aspect of the invention, a transaction log can be generated for each data page and can record modification events to the page over time. Periodically, a flush file buffer command can be issued that results in all pages in the buffer being written to disk, creating a checkpoint event. The checkpoint event can be employed to delineate truncated segments of the transaction log for a given page. Upon a system failure, a data page can be read as of a most recent checkpoint event, and can be modified according to information recorded in the log segment from the checkpoint forward in time. The modified checkpointed page can then be written to the original and mirror databases to make the databases current as of the time of the system failure.

According to yet another aspect of the invention, page status can be determined via assessing temporal aspects of page images in each of the buffer memory, the original database, and the mirror database, such that page images in each instance can be described be a chronological relationship. For example, page status can indicate that indicate that original and mirror images of a given data page are identical, but that the buffer image of the page is more recent (e.g., has been modified since a last write to either database). According to this example, the page status can trigger a write to the mirror database followed by a subsequent write to the original database to ensure that all page images are current. Other page statuses as well as events triggered thereby are presented in greater detail infra.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
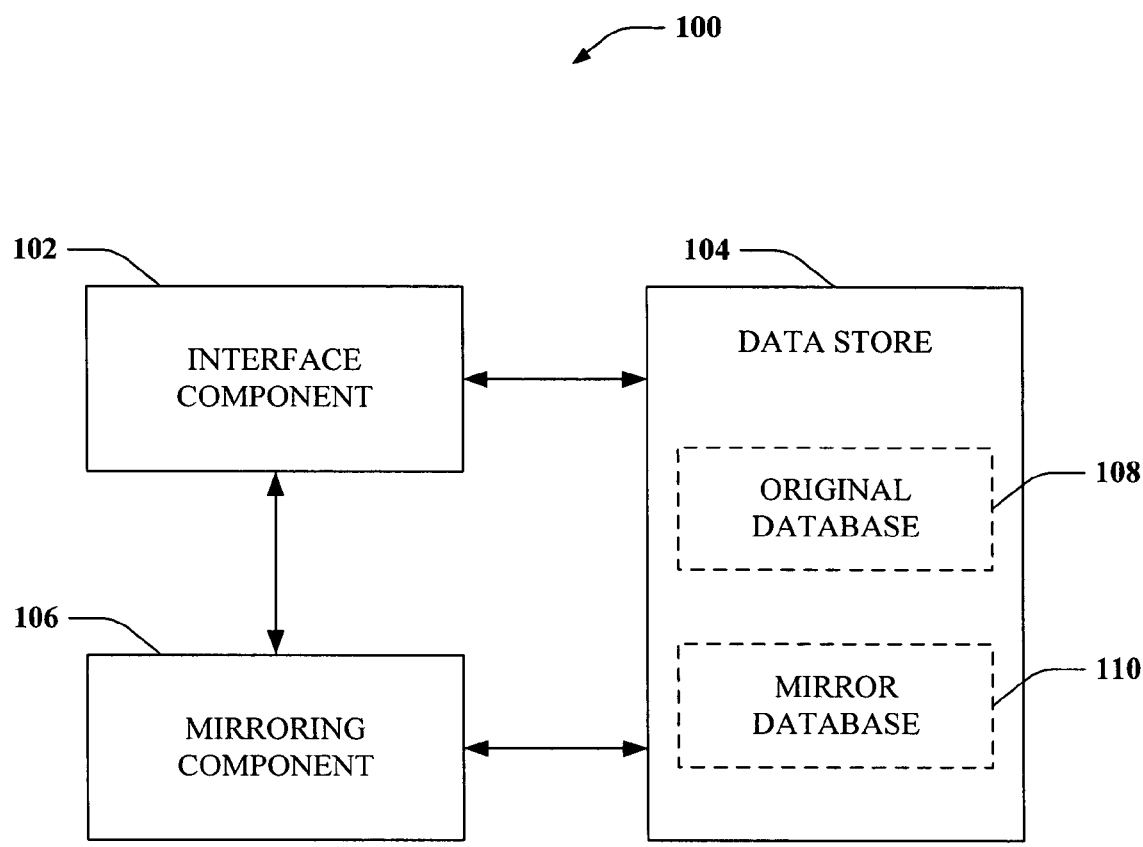
FIG. 1 is an illustration of a system that facilitates generating a mirror copy of a database page for storage as a backup copy of the page, in accordance with an aspect of the subject invention.

The following terms are used throughout the description, the definitions of which are provided herein to assist in understanding various aspects of the subject invention.

Dirty page: a data page containing modifications that have yet to be flushed to stable storage, or disk.

Clean page: a page that has not been modified or that has been flushed to stable storage since a last modification.

Torn page: a page that is corrupt due to a failure event that occurred during a write of the page to stable storage.

Failure event: an event that causes an outage in a computing device, such as a power outage, system reset, memory error, OS failure, etc.

Flush: forcing a cache buffer to stable storage.

Latch: a synchronization object employed to protect the physical consistency of a resource.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject invention provides systems and methodologies related to mirroring database files at a data page level. The invention can maintain two images of a single database page in two different files. A database file can be, for example, a unit of data that is configurable for mirroring. Flush sequence numbers (FSNs) can be utilized to implement a mechanism that facilitates mirroring data pages on, for example, an integrated device electronics (IDE) drive, which can be employed in conjunction with a structured query language (SQL) engine that enforces write-ahead logging (WAL) protocols on the IDE drive(s). Additionally, mirrored page state transition can be generated and employed to facilitate analyzing potential states of one or more data pages. Such analysis can in turn facilitate generating pseudo code for writing a mirrored page to disk when the mirrored page satisfies at certain requirements described by a mirroring algorithm.

FIG. 1 is an illustration of a system 100 that facilitates generating a mirror copy of a database page for storage as a backup copy of the page, in accordance with an aspect of the subject invention. The system 100 comprises an interface component 102 that receives input related to a changes or modifications to a data page in a data store 104. The interface component 102 can be, for example, a personal computer, a PDA, a laptop, a cellular phone, a computer application, etc., and/or any other suitable entity that can receive and/or generate input related to data modification. A mirroring component 106 is operatively coupled to the interface component 102 and the data store 104, and can facilitate generation and/or maintenance of mirror files and/or databases, which are replicas of corresponding original data files and/or databases. The mirror file database 110 can be generated and/or maintained online and can grow or shrink as the original database 108 grows or shrinks. A simple mirroring algorithm is presented below that facilitates generating the mirror database 110.

```
1. Create a mirror file.
2. Make the mirror file of the same size as the original
   file.
3. foreach (page in the original file)
4.     Fix page
5.     Dirty page
6.     Unfix page
7. endforeach
8. Write critical pages to the mirror file
9. Checkpoint the database
```

It will be appreciated that the a syntax for generating mirror files can be generated as an extension of, for example, an ALTER DATABASE syntax. For instance, the following snippet of pseudo code represents suitable syntax for generating mirror files:

```
ALTER DATABASE abc
    MODIFY FILE (NAME = abc_fileX,
        MIRRORFILE = 'os_file_name' |
        NOMIRROR)
```

Thus, if a file name is specified in the MIRRORFILE option and the original file is not mirrored, then the mirroring component 106 can generate a mirror file. Additionally, if NOMIRROR is specified in the MIRRORFILE option and the original file is already mirrored, then the mirror component 106 can delete the mirror file.

When data files are modified, original versions of data files and/or pages can be stored in an original database 108 in the data store 104, while mirror images of the files can be written to and stored in a mirror database 110 prior to writing to the original database 108 upon the modification. An algorithm for achieving such sequential writes is presented below, wherein a flush file buffer command is employed to avoid simultaneous torn writes in both the original database 108 and the mirror database 110 on, for instance, an IDE drive.

```
1.  if page is dirty
2.      if page is being mirrored
3.          Acquire I/O latch for the page
4.          Write the page to the mirror file
5.          Flush file buffers
6.          Write the page to the original file
7.          Flush file buffers
8.          Release I/O latch
9.      else
10.         Proceed as usual
11.     endif
12. endif
```

The above algorithm exhibits various properties that facilitate page restore without requiring changes to for instance, crash recovery, log truncation associated with a WAL protocol, etc. For example, a data page in a file in the mirror database 110 can be at least as recent as the original version of the data page in the original database 108. Thus, if a failure occurs after (4) above, then a crash recovery can update the original page, such that upon completion of crash recovery (e.g., a checkpoint . . . ) both the mirror file and the original file can comprise the same, most recent, image of the page. Additionally, upon completion of a checkpoint, images of all dirty pages written to disk during the checkpoint can be synchronized in both the mirror file and the original file, and a transaction log associated with the file, which records page modifications, can be truncated accordingly. If a failure occurs during (4) above, then a torn page can occur in the mirror file while the original file in the original database 108 maintains an older good copy of the data page. During crash recovery, the mirror component 106 can modify the page in the mirror database 110 to synchronize it with the most-recent good page copy in the original database 108. Similarly, a failure that occurs during (6) above can result in a torn page in the original database. According to this scenario, the mirror database 110 can comprise a most-recent good copy of the data page. During crash recovery, the mirroring component 106 can attempt to access the torn page in the original database 108, can recognize the original page as being torn (e.g., corrupt . . . ), and can replace the page in the original database 108 with a good copy of the mirrored page.

Such properties of the mirror algorithm employed by the mirroring component 106 can be summarized into four general conditions of the mirror algorithm. A first condition MC1 of the mirror algorithm is that the same page should not be permitted be torn in both the original file and the mirror file at the same time. A second condition MC2 is that any page for which images in both the original and mirror files differ is detected during crash recovery. A third condition MC3, can be that both original and mirror page versions for a given page are identical after crash recovery. Finally, a fourth mirroring condition MC4 can be that page images in both the original and mirrored data files are more recent than a beginning log record for a most recent completed checkpoint, or images are identical (e.g., a log sequence number for both images is either greater than the log sequence number of the beginning checkpoint record of the most recent checkpoint, or the images are identical).

It will be noted that the mirror algorithm holds the I/O latch on a page for the duration of two I/O operations and two flush file buffers commands. Additionally, the algorithm suggests that the flush file command be iterated for each page upon writing the page version to disk. The algorithm can be appropriately manipulated to overcome any potential issues that may arise with regard to such aspects.

For example, flush sequence numbers can be employed to streamline algorithm efficiency to ensure that two copies of a single database page are maintained at any point in time. An FSN represents the number of flush file buffer commands since system startup, such that the highest FSN corresponds to a most-recent completed flush file buffers command. An FSN can be monolithically incremented each time a flush file buffers command is completed. Accordingly, the mirror component 106 can write a dirty page (e.g., a modified page . . . ) to the original database 108 when a most-recent write of the mirror copy of the page has been hardened to disk, and vice versa. To mitigate unnecessary flush file buffer commands, issuance of such commands can be limited to situations in which a number of completed writes of mirrored pages exceeds a predetermined threshold value and/or expiration of a predefined periodic flush timeout. Each mirrored page can be associated with an in-memory FSN, such that when a page write of a mirrored page to the mirror database 110 is complete, the FSN for the page can be set to the most-recent FSN. A mirrored page copy can be written to the mirror database 110 when its FSN is less than or equal to the most recent FSN. FSN page numbers need not be persisted in the data store 104 or databases 108 and 110, and can be stored in a BUF field. Additionally, states of a mirrored page can be stored in a BUF structure. An algorithm that facilitates maintaining a most recent FSN and employing a next FSN in order to mitigate potential race conditions between flush file buffer commands and mirrored page writes is presented below, for example:

```
1.   if number of mirrored pages written since the last
     flush <= threshold OR flush timeout has expired
2.       Assert (nextFSN == lastFSN + 1)
3.       nextFSN = nextFSN + 1
4.       Flush file buffers
5.       lastFSN = lastFSN + 1
6.       Assert (nextFSN == lastFSN + 1)
7.   endif
```

Additionally, an algorithm that facilitates maintaining in-memory page FSNs is represented by the following example:

```
1.   if page is dirty
2.       if page is being mirrored
3.           if page FSN <= lastFSN
4.               Acquire I/O latch
5.               Write page to disk (mirror or original file)
6.               page FSN = nextFSN
7.               Release I/O latch
8.           endif
9.       else
10.          Continue as usual
11.      endif
12.  endif
```

The mirroring component 106 can thus employ FSNs to mitigate unnecessary instantiations of flush file buffers commands in order to reduce demands on system resources, as well as to mitigate holding the I/O latch on a page for the duration of two flush file buffer commands in favor of holding the I/O latch on the page only for one flush file buffer command.

Figure 2:
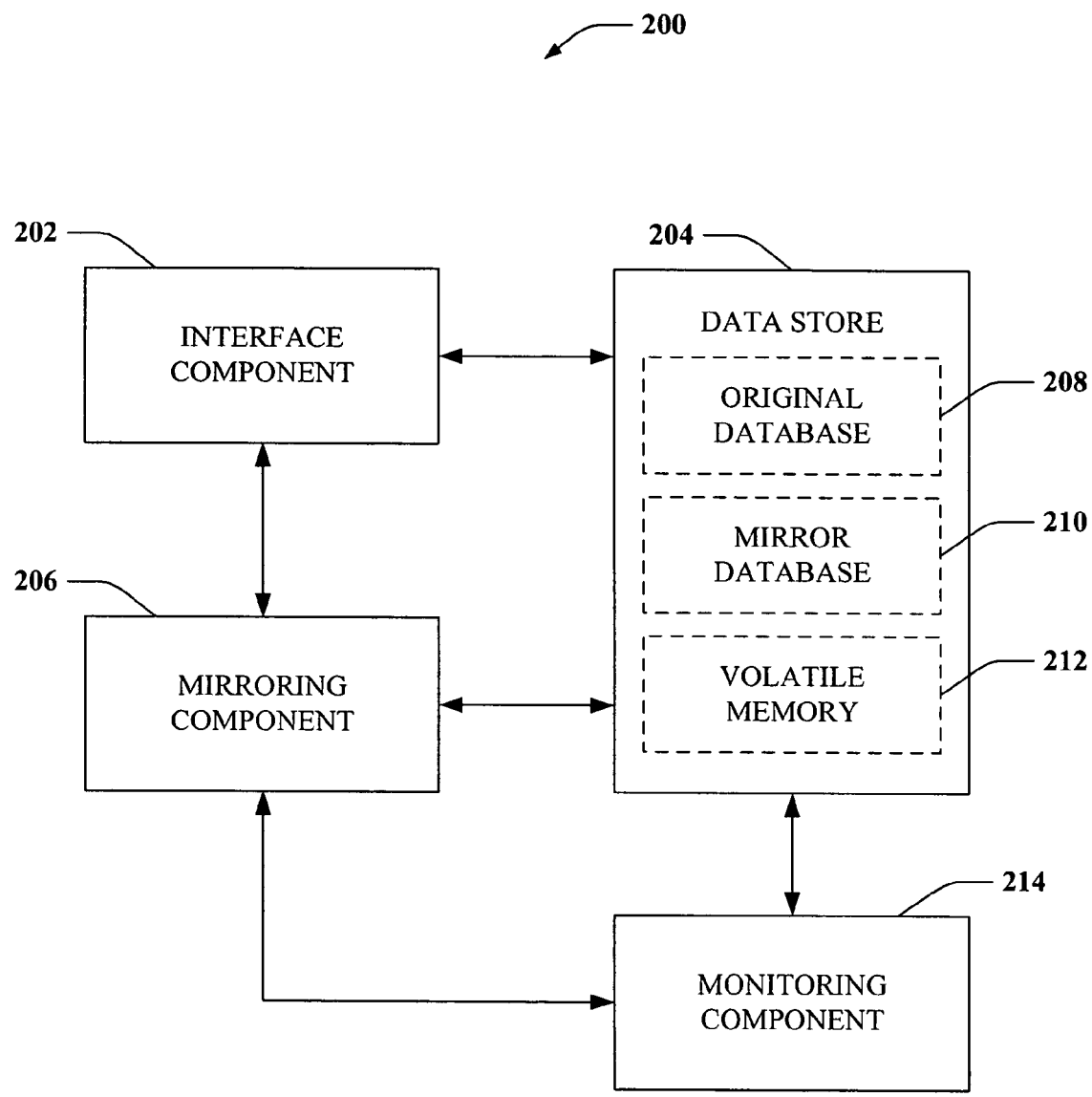
FIG. 2 is an illustration of a system that facilitates maintaining two copies of a data page at any given time to permit recovery of data pages in the event of a data corruption event, in accordance with the subject invention.

FIG. 2 is an illustration of a system 200 that facilitates maintaining two copies of a data page at any given time to permit recovery of data pages in the event of a data corruption event, in accordance with the subject invention. The system 200 comprises an interface component 202 that receives information related to modifications to a data page, and is operatively coupled to a data store 204 that maintains data in data files, which in turn can comprise data pages. A data page can be, for example, approximately 8 Kb in size. The interface component 202 and the data store are operatively coupled to a mirroring component 206 that provides data backup and restore functionality to the system 200, as detailed with regard to FIG. 1. The data store 204 comprises an original database 108 the stores data files and/or pages and a mirror database that maintains mirror copies of data files and/or pages thereof. Additionally, the data store 204 comprises volatile memory 212, such as a buffer memory, that can be utilized to store information related to data modifications prior to and during writing to a mirrored data page and/or an original data page. A monitoring component 214 is operatively coupled to each of the mirroring component 206 and the data store 204, as well as the databases 208, 210, and 212 of the data store 204.

The monitoring component 214 can be employed to assess a status of each data page in the databases, as well as portions of data pages. The monitoring component 214 can employ a corruption detection technique (e.g., a checksum technique, . . . ) to determine whether a corrupted data value is present in a page or a portion thereof, and can communicate with the mirroring component 206 to initiate a restore procedure as necessary. For example, the checksum can be 8 bits (e.g., modulo 256 sum, . . . ), 16 bits, 32 bits, or any other suitable size, and can be computed by summing the bytes or words of the data page ignoring overflow. The checksum can be negated if desired so that the total of the data words plus the checksum is zero. Additionally, the monitoring component 214 can determine states of pages, such as whether a mirrored page version represents a more recent copy of its corresponding original page, and vice versa. Moreover, the monitoring component 214 can determine whether page data stored in volatile memory 212 is more recent that information in one or both of the mirror database 210 and the original database 208, which can prompt a page update to be initiated. States of the pages can be assessed periodically and/or continuously during data modification and/or can occur during a restore operation after, for example, a failure of a computing system in which the system 200 is employed. State transition analysis can be employed to facilitate such status assessment and/or data restore functionality, as is detailed infra with regard to FIGS. 3 and 4.

Figure 3:
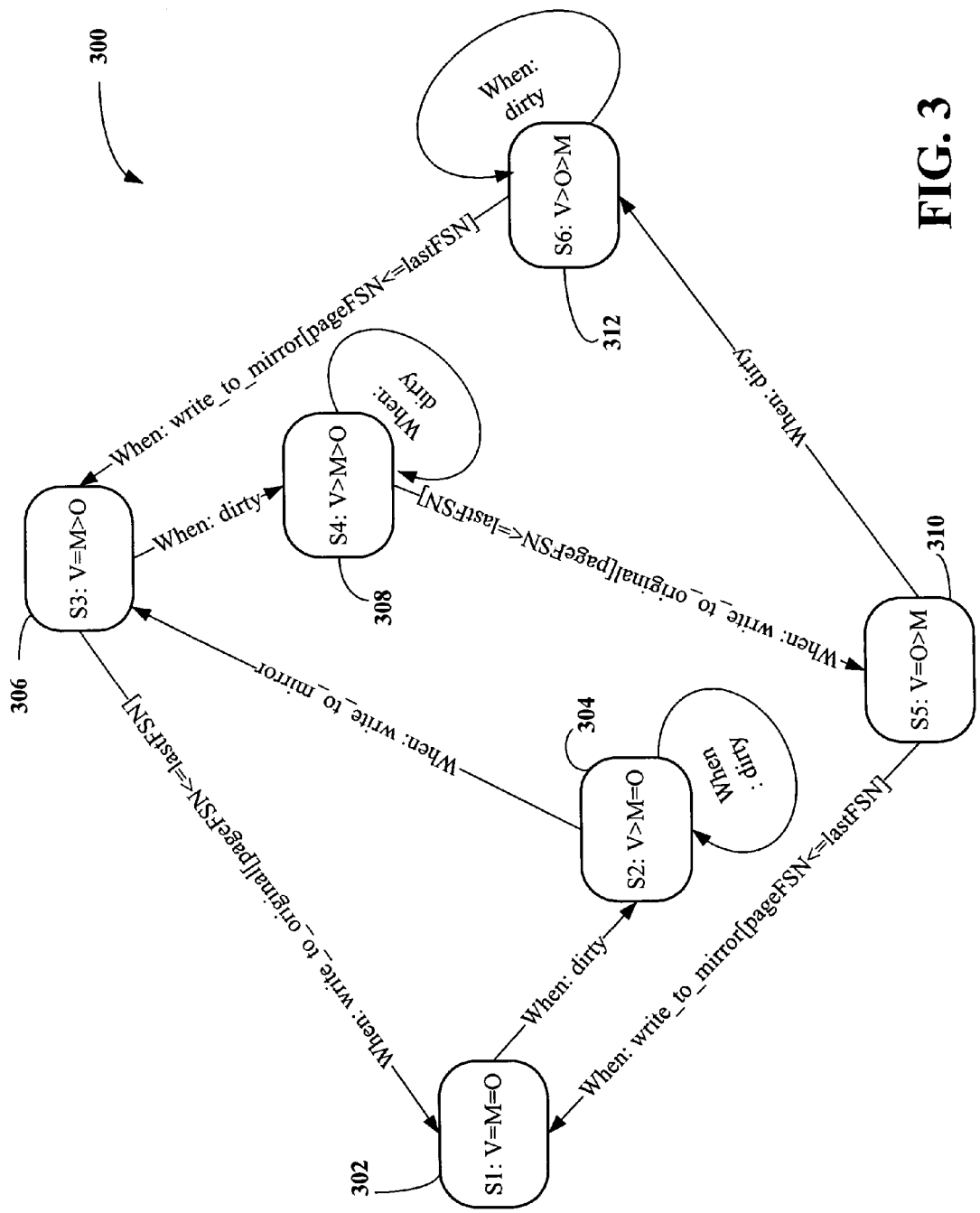
FIG. 3 illustrates a state transition diagram that represents states of mirrored page copies and relationships thereof to original pages and modified pages in volatile memory in accordance with an aspect of the subject invention.

FIG. 3 illustrates a state transition diagram 300 that represents states of mirrored page copies and relationships thereof to original pages and modified pages in volatile memory in accordance with an aspect of the subject invention. As detailed above with regard to FIG. 1, maintenance of an I/O latch on a mirrored page can be reduced to a duration of not longer than a single I/O write operation. Between I/O write operations, a page can exist in different states with regard to page versions in a mirror file, an original file, and volatile memory. For instance, when a mirrored page is stored in memory and has a clean state, all three images of the page (e.g., original, mirrored, and volatile) can be in the same state. If a mirrored page is dirtied and subsequently written to the mirror file or database, page versions in the mirror file and in volatile memory can be more recent that the original page version.

According to FIG. 3, pages in volatile memory, the mirror file, and the original files are represented by the letters V, M, and O, respectively. Each possible page state can be defined by relationships between such page versions. For instance, a clean page state 302 can occur when V=M=O, such that all page versions are the same. Similarly, V=M>O can indicate a dirty page state 304 (e.g., has been modified . . . ), such that volatile memory and the mirror file contain more recent page versions than the original file. A failure or crash that occurs when pages are in either of the states 302 or 304 will have the same result after recovery: both the mirror version and the original version of the page will be synchronized. A third state 306 illustrates another dirty page arrangement, wherein the in-memory image of a page and the mirror image of the page in a mirror file are of equivalent age and most recent, but the original image of the page is not current. The occurrence of a crash in this state can trigger a recovery mechanism that can update the original page image to synchronize it with the mirror image of the page.

A fourth state 308 is depicted that illustrates page statuses in which the in-memory page image is more recent than the mirrored image of the page, which in turn is more recent than the original page image. Crash recovery when page images are in state 308 can mimic the recovery mechanism for the third state, 306, whereby the original page image is updated to synchronize it with the more recent mirrored image.

In a fifth state 310, the in-memory image and original image are synchronized and more recent than the mirror image of a page. Conventional mirroring/recovery algorithms cannot account for page images in this state upon failure event because there is no indication that O and M are not synchronized. If the page is not modified (e.g., dirtied) until a subsequent log truncation, the mirror page image will not be useful should the original page image experience a corruption event. The subject invention overcomes such deficiencies of traditional systems by persisting a flag in the page header when the page is written to the original file to indicate that the original page image is more recent than the mirror page image (e.g., O>M). A checkpoint algorithm, described infra, can ensure that O and M are equivalent at the end of each checkpoint, or, at a minimum, there exists at least one update record in a transaction log for the page after completion of the checkpoint. When a log update record is present, the original page can be read into memory upon crash recovery. Additionally, crash recovery can assess the O>M flag in a page header, and, if set, can update the page in the mirror file.

Finally, in a sixth state 312, an in-memory page version is more recent than an original page version, which in turn is more recent than a mirror version of the page. Crash recovery in this state can mimic recovery from the third state 306 and/or the fourth state 308, assuming that page updates represented in the in-memory page version are written to the transaction log prior to a failure event. If such page updates are not written to the transaction log, then the O>M flag is available to facilitate crash recovery as detailed with regard to the fifth state 310.

State transitions for a mirrored page can occur when a page is dirtied and/or when it is written to a mirror database or an original database in a data store. When a mirrored page is written to disk, such writing can be protected via an FSN check that ensures that the FSN associated with the page is less than or equal to a most recent FSN. In this manner, page versions in different files cannot simultaneously be torn (e.g., corrupted).

The state transition diagram 300 illustrates a unique transition between the fourth state 308 and the fifth state 310, wherein upon detection that V>M>O, a write can be performed to the original file to achieve a state 310 such that V=O>M. The O>M flag can be persisted in the page header, which indicates that the page version in the original file is more recent that the version in the mirrored file. As such, the state of the page is in accordance with aspects MC1 and MC2 set forth supra with regard to FIG. 1. Specifically, the guard condition "[pageFSN<=lastFSN]" satisfies aspect M1 (e.g., pages are not torn in both the original and mirrored files . . . ), while states 304, 306, 308, 310, and 312 accord with MC2 (e.g., pages with different versions can be detected during a crash recovery . . . ) when MC4 is enforced. It will be appreciated that by setting the O>M flag in the page header when the original page image is more recent than the mirrored page image, in conjunction with the checkpoint algorithm detailed below, which ensures that at least one page update record is extant in the transaction log for the page, any page that has a set O>M flag will not be removed from a dirty page table during an analysis pass by a lazy writer. As such, a page with a set O>M flag will be read into memory during crash recovery, and can trigger an in-memory version of the page to be dirtied, which in turn forces the in-memory image to be written to both the original and mirror files. Additionally, a page can be dirtied and its state can be set to the fifth state 310, which can induce a single write to the mirror file.

Figure 4:
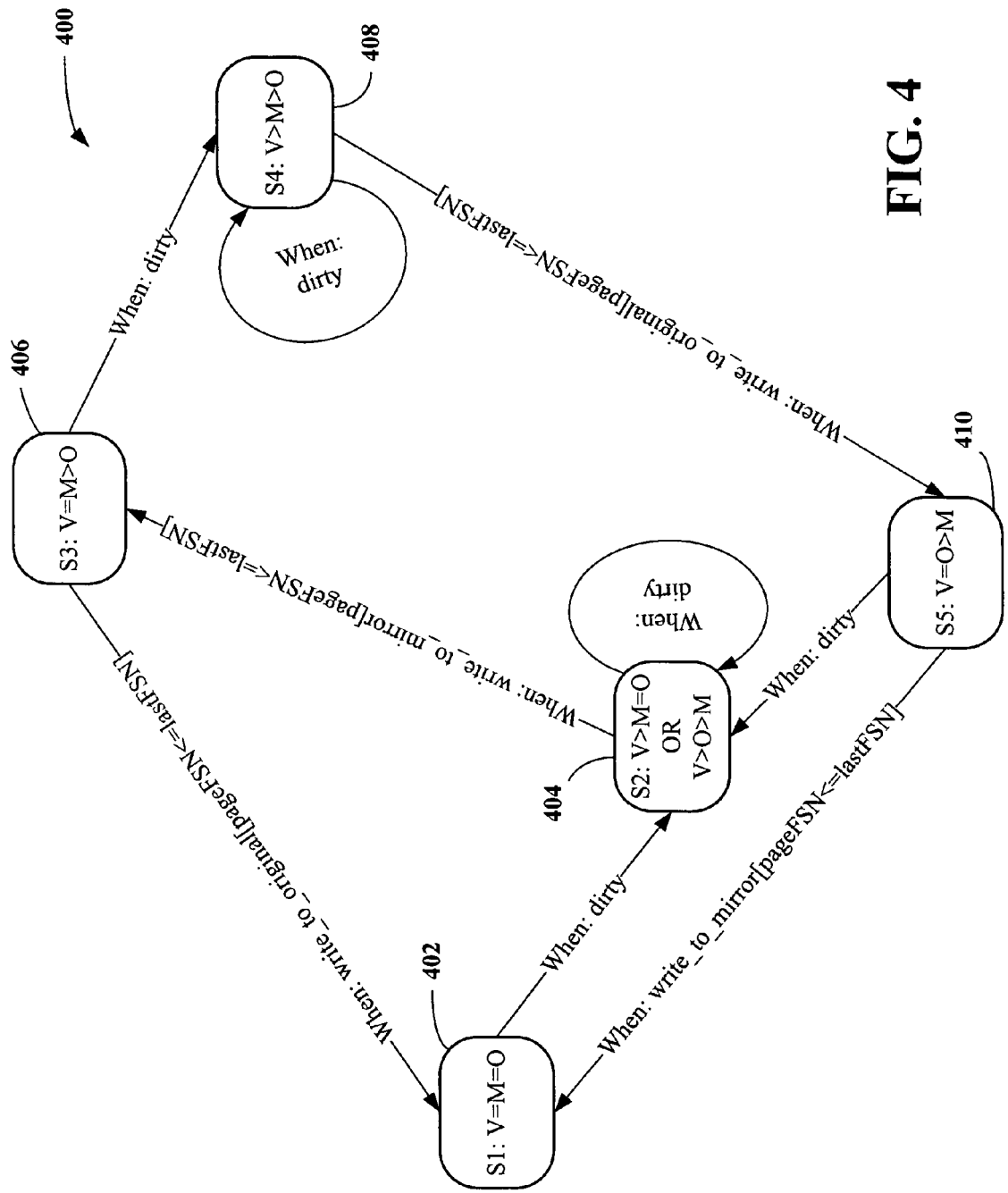
FIG. 4 is an illustration of a minimized state transition diagram that equivalent to the state transition diagram of FIG. 3, in accordance with an aspect of the subject invention.

FIG. 4 is an illustration of a minimized state transition diagram 400 that equivalent to the state transition diagram of FIG. 3, in accordance with an aspect of the subject invention. According to the figure, a first state 402 is maintained, while an FSN guard check (e.g., [pageFSN<=lastFSN]) has been added to the transition between a second state 404 and a third state 406. Additionally, the sixth state 312 of FIG. 3 has been reduced and merged into the second state 404, while the fourth state 408 and fifth state 410 have been maintained. Thus, the state transition diagram 400 satisfies aspects MC1 and MC2, as does a method of implementing such state transitions and controlling writes for mirrored pages. For example, mirrored page writes can be controlled via controlling dirty transactions when a mirrored page is dirtied and by controlling all write transactions in conjunction therewith. The following example of pseudo code, called Write MirrorPage( ), illustrates a manner in which such control can be exerted, wherein S(p) denotes a state of a mirrored page:

```
    1.  if page FSN <= last FSN
    2.      Acquire I/O latch
    3.      if S(p) == S2
    4.          Write page to mirror
    5.          S(p) = S3
    6.      else if S(p) == S3
    7.          Clear the O>M flag in the page header
    8.          Write page to original
    9.          Mark page clean
    10.         Record page was written
    11.         S(p) = S1
    12.     else if S(p) == S4
    13.         Set the O>M flag in the page header
    14.         Write page to original
    15.         S(p) = S5
    16.     else if S(p) == S5
    17.         Write page to mirror
    18.         Mark page clean
    19.         Record page was written
    20.         S(p) == S1
    21.     endif
    22.     Set page FSN to the next FSN
    23.     Release I/O latch
    24. endif
```

Figure 5:
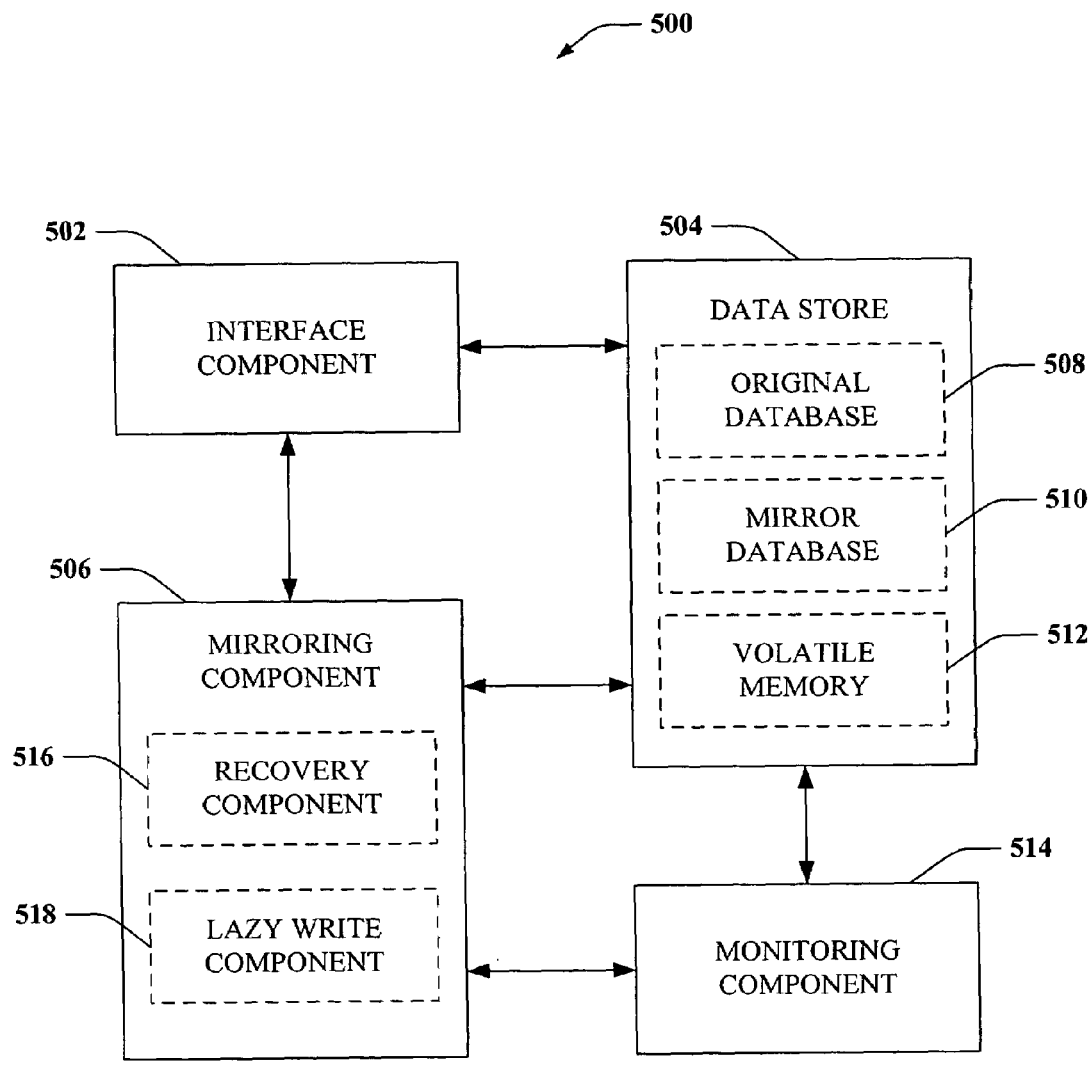
FIG. 5 is an illustration of a system that facilitates maintaining dual versions of a data page in separate databases to provide recovery functionality in the event of a system failure, in accordance with an aspect of the subject invention.

The above pseudo code can be employed when defining functionalities for a "lazy writer" algorithm and/or a recovery algorithm, which are described in greater detail infra, with regard to FIG. 5.

FIG. 5 is an illustration of a system 500 that facilitates maintaining dual versions of a data page in separate databases to provide recovery functionality in the event of a system failure, in accordance with an aspect of the subject invention. The system 500 comprises an interface component 502 that can receive information related to a page modification, which is operatively coupled to a data store 504 and a mirroring component 506. The data store can comprise an original database 508 that stores original versions of data pages and/or files, a mirror database 510 that stores backup mirrored versions of the data files and/or pages, and volatile memory 512 that can maintain versions of pages during modification of data in the data pages. The system 500 can additionally comprise a monitoring component that determines page status (e.g., clean, dirty, corrupt . . . ). The mirror component 506 can comprise a recovery component 516 and a lazy writer component 518, (e.g., also referred to hereinafter as a "lazy writer").

The recovery component 516 can employ a crash recovery algorithm that is in accord with MR3 as detailed above with regard to FIG. 1. The algorithm can be employed under operating conditions in which MC4 is satisfied, such that all relational situations between an original version of a page (O) and a mirrored version of a page (M) can be represented and accounted for. For example, when original and mirrored page versions are the same (M=O) prior to a crash recovery, and a page version is dirtied during crash recovery, then both page versions can be updated to satisfy MC3. If the mirrored version of the page is more recent than the original version (M>O), the page can be dirtied and written such that both page versions will be the same after recovery. Finally, if the original version of the page is more recent than the mirrored version (M<O), then, since MC4 is enforced, there can be at least one extant update record, maintained in an update log for the page, which can cause a reading of the page during recovery. Upon detection of an O>M flag set in the page header, the page can be determined to be unconditionally dirty. Both original and mirrored page versions can then be updated according to the original version and any logged update events so that they are the same and current after the recovery.

Pseudo code that facilitates achieving the above is presented below, for example:

```
1. Fix page.
2. if page is being mirrored
3.     if page is not dirty
4.         if the O>M flag in the page header is set
5.             Mark page dirty
6.         endif
7.     endif
8. endif
9. Continue as usual
```

In this manner, the recovery algorithm can ensure that all versions of a page are up to date and identical after a crash recovery procedure performed by the recovery component 516.

The lazy writer 518 can employ the WriteMirrorPage( ) algorithm presented above with regard to FIG. 4 to facilitate writing to mirrored pages in the mirror database 510. For instance, the lazy writer 518 can enforce MR1 and MR2 while mitigating nay effects on MC3 and MC4. For instance, the lazy writer 518 can employ an algorithm such as the following to achieve a write to the mirror database 510:

```
1. if page references is 0
2.     if page is dirty
3.         if page is being mirrored
4.             WriteMirroredPage( )
5.         else
6.             Continue as usual
7.         endif
8.     endif
9. endif
```

Figure 6:
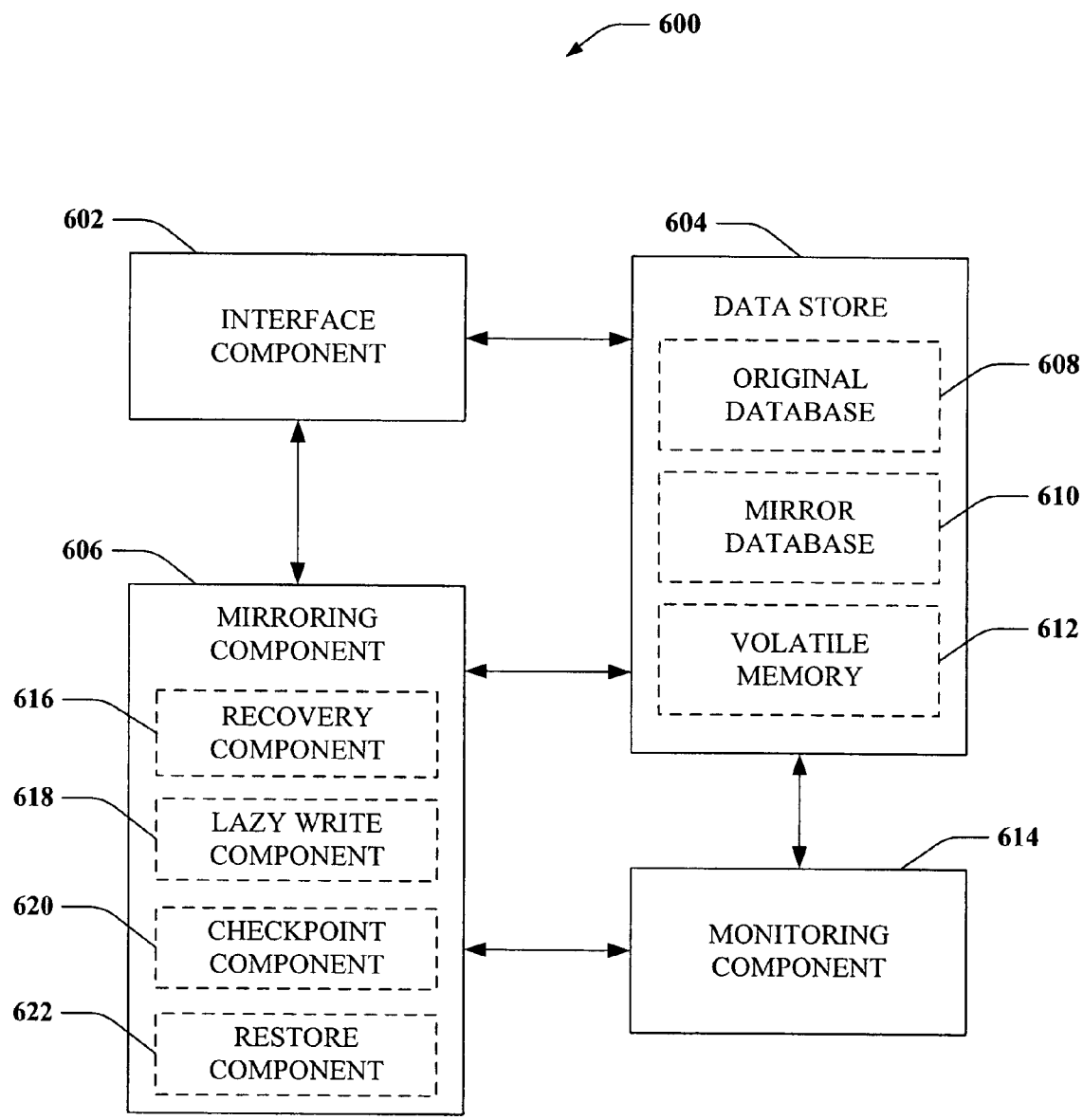
FIG. 6 illustrates a system that facilitates storing mirrored page copies to provide data restore functionality in accordance with an aspect of the subject invention.

FIG. 6 illustrates a system 600 that facilitates storing mirrored page copies to provide data restore functionality in accordance with an aspect of the subject invention. The system 600 comprises an interface component 602 that is operatively coupled to both a data store 604 and a mirroring component 606, which in turn are operatively coupled to each other, as detailed with regard to the previous figures. The data store 604 can comprise an original database 608 that stores original versions of data files and/or pages, a mirror database 610 that can maintain mirrored versions of data pages, and volatile memory 612 that can store page versions during data manipulation and/or modification. The system 600 can further comprise a monitoring component 614 that can perform a checksum technique on data in one or more pages in the data store 604 to determine whether corruption has occurred. Additionally, the mirroring component 606 can comprise a recovery component 616 and a lazy writer 618, as detailed above with respect to FIG. 5.

The mirroring component 606 can further comprise a checkpoint component 620 that can perform one or more passes over pages to determine status relationships between mirrored page versions and their original page counterparts. For example, a checkpoint algorithm can enlist the WriteMirroredPage( ) algorithm to enforce MC1 and MC2. The checkpoint component 620 can then perform two passes over a particular page to determine whether page original and mirrored page versions are identical or whether both versions have been updated between a checkpoint start and end. Logs can be generated for each page wherein page updates and/or modifications can be recorded, whereby updates to pages are assigned a log sequence number (LSN). A log for a given page can be truncated up to the LSN of an oldest active transaction/modification or to a most recent complete checkpoint, according to whichever LSN is smaller. For example, the pseudo code presented below describes the checkpoint algorithm that can be employed by the checkpoint component 620 to achieve the above-detailed objectives.

```
1.   Start checkpoint
2.   Start pass one
3.   Flush file buffers
4.   foreach (dirty page)
5.       if page is mirrored
6.           WriteMirroredPage( )
7.       else
8.           Continue as usual
9.       endif
10.  end foreach
11.  End pass one
12.  Start pass two
13.  Flush file buffers
14.  foreach (dirty mirrored page)
15.      WriteMirroredPage( )
16.  end foreach
17.  End pass two
18.  Flush file buffers
19.  End checkpoint
```

In this manner, MC4 can be satisfied and the lazy writer 618 and recovery component 616 components can be employed to mirror database pages as detailed above.

The mirroring component 606 can further comprise a page restore component 622 that utilizes an automatic and transparent algorithm to restore pages in a database. Pages can be read from the original database 608, and, upon detection of corruption by the monitoring component 614 during a read, the mirrored version of the page can be retrieved from the mirror database 610. The mirrored page can be dirtied and is state can be set to S3, as described in FIG. 4. The corrupt original page can be updated with the uncorrupt mirrored page version to restore the page in the original database. The following algorithm illustrates the mechanism by which the restore component 622 can facilitate restoring a data page:

```
1.   Read page from original
2.   if page is corrupted
3.       if page is being mirrored
4.           Read page from mirror
5.           if page is not corrupted
6.               Dirty page
7.               S(p) = S3
8.           else
9.               Raise error
10.          endif
11.      else
12.          Raise error
13.      endif
14.  endif
```

Figure 7:
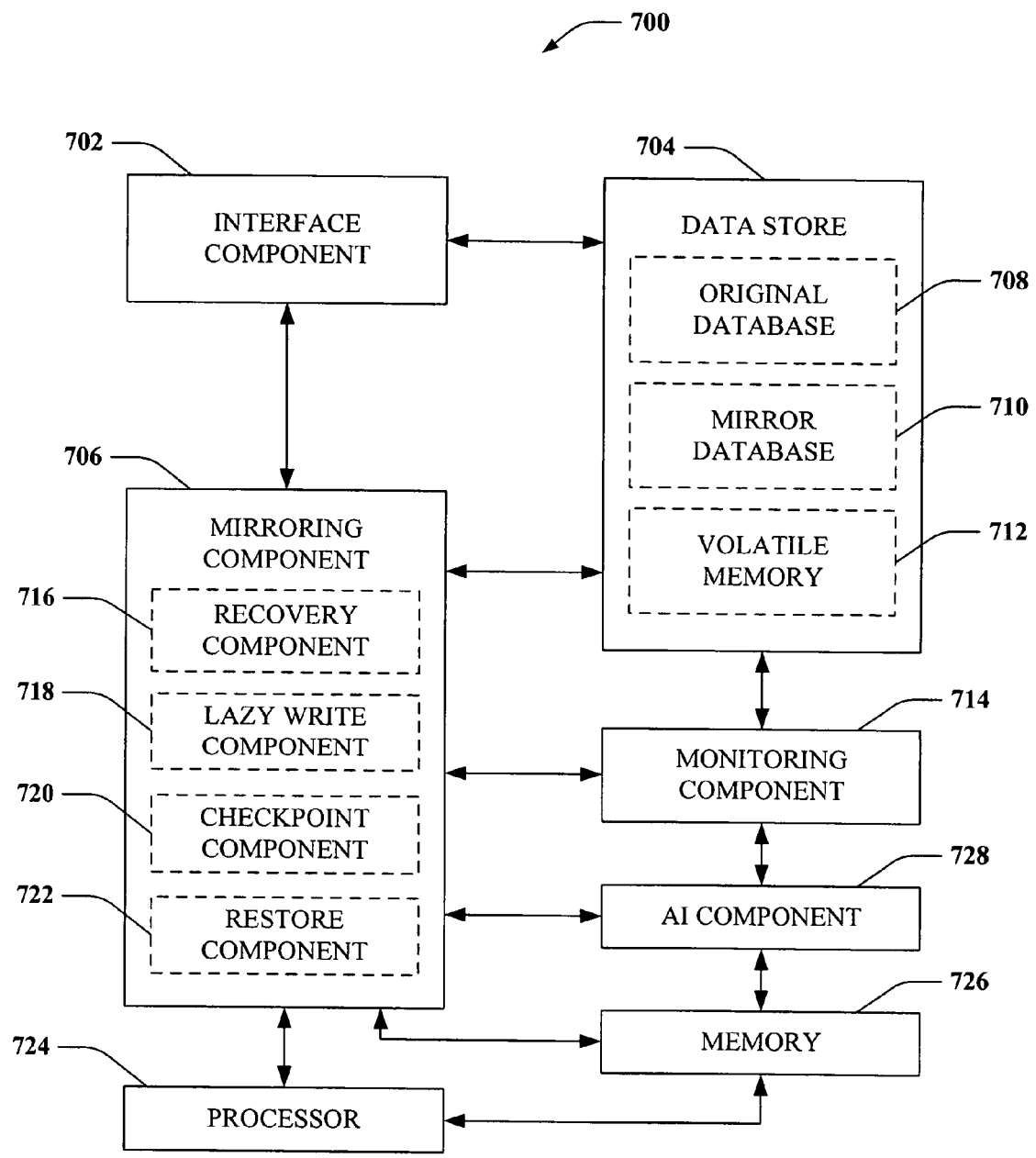
FIG. 7 illustrates a system that facilitates providing data recovery at a page level in accordance with an aspect of the subject invention.

FIG. 7 illustrates a system 700 that facilitates providing data recovery at a page level in accordance with an aspect of the subject invention. The system 700 comprises an interface component 702 that receives information related to data modifications and is operatively coupled to each of a data store 704 and a mirroring component 706. The data store comprises an original database 708, a mirror database 710, and volatile memory 712 as detailed with regard to the preceding figures. The system 700 further comprises a monitoring component 714 that is operatively associated with each of the data store 704 and the mirroring component 706, and which monitors data pages to detect a corruption event associated therewith. The mirroring component comprises each of a recovery component 716, a lazy writer 718, a checkpoint component 720, and a restore component 722, as set forth with regard to previous figures.

Additionally, the system 700 comprises a processor 724 and a memory 726 that are operatively coupled to the mirror component 706 and to each other. It is to be appreciated that the processor 724 can be a processor dedicated to analyzing and/or generating information received by the mirroring component 706, a processor that controls one or more components of the system 700, and/or a processor that both analyzes and generates information received by the mirroring component 706 and controls one or more components of the system 700.

The memory 726 can additionally store protocols associated with generating snapshots, logs, etc., such that the system 700 can employ stored protocols and/or algorithms to achieve page-level restore as described herein. It will be appreciated that the memory 726 component described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 726 of the subject systems and methods is intended to comprise, without being limited to, these and any other suitable types of memory.

The mirroring component 706 is further operatively associated with an artificial intelligence (AI) component 728 that can make inferences regarding operation of the system 700. For example, the AI component 728 can infer a proper time at which to initiate a system restore, and/or recovery algorithm, based at least in part on information related to data page status and the like. According to another example the AI component 728 can make inferences regarding whether a page and/or file should be mirrored (e.g., whether updates to the page or a portion thereof warrant generation of a mirror file . . . ), etc. According to yet another example, the AI component 728 can infer an appropriate temporal distance between checkpoints (e.g., log length . . . ), reduction of which can facilitate restore times, etc. It will be appreciated that the foregoing are but a few examples of inferences that can be made by the AI component 728, and are not intended to limit the number of inferences that can be made by the AI component 728, or the manner in which the AI component 728 makes inferences.

The subject invention (e.g., in connection with database file mirroring), via the AI component 728, can employ various artificial intelligence based schemes for carrying out various aspects thereof. For example, a process for determining when a data page should be written, mirrored, etc., can be facilitated via an automatic classifier system and process. Moreover, when a data page is corrupted, the classifier can be employed to determine an appropriate page copy to employ to restore the page, appropriate adjustments to the restored page (e.g., logged transactions . . . ), etc.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of system crash recovery, for example, attributes can be page modifications or other data-specific attributes derived from the modifications, and classes can be categories or areas of interest (e.g., validation of written pages, priorities . . . ).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

Figure 8:
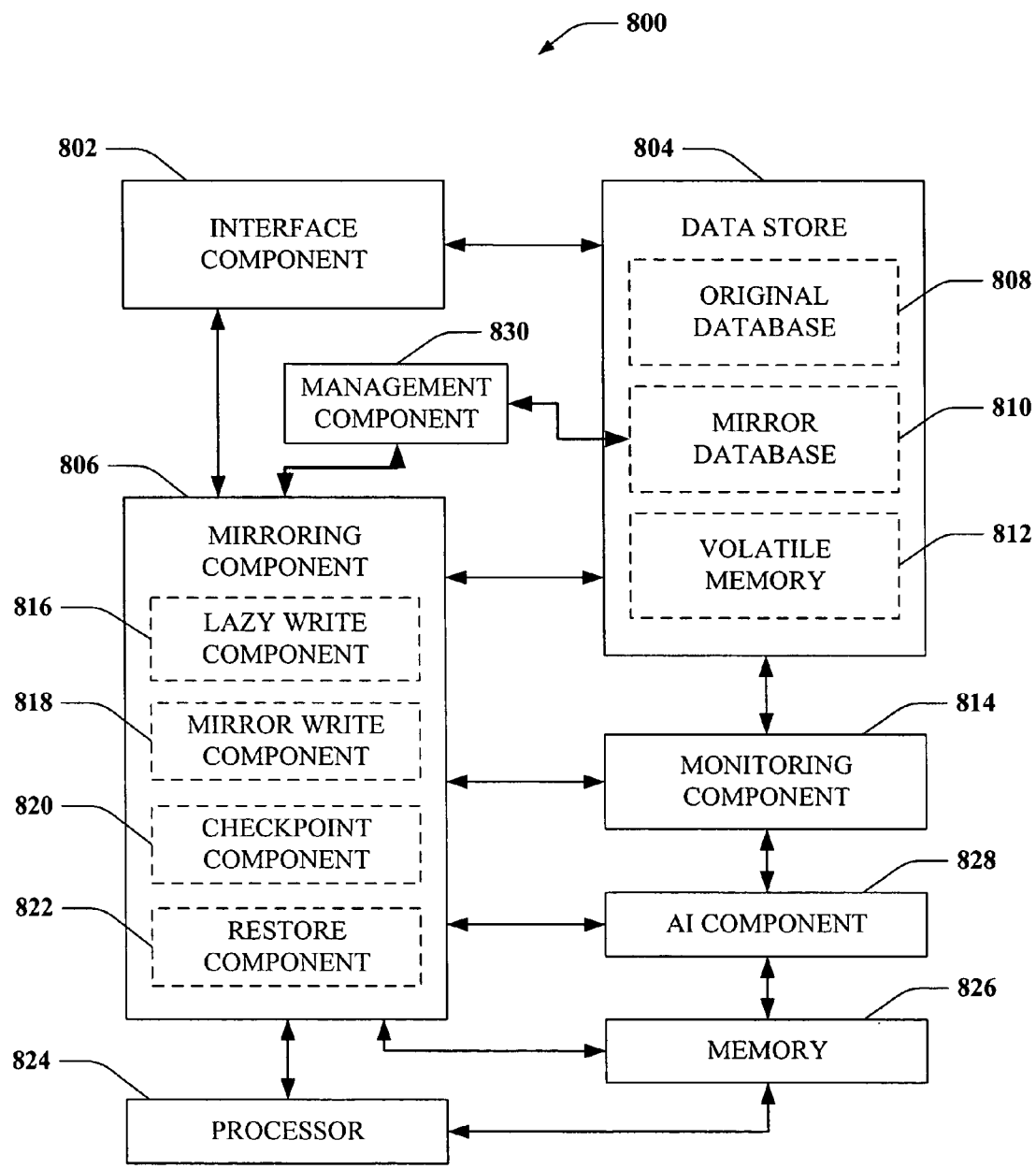
FIG. 8 is an illustration of a system that facilitates data restoration at a page level via utilizing a data page mirroring technique, in accordance with an aspect of the subject invention.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to determining according to a predetermined criteria how frequently to write a modified page to disk, how long (e.g., how many passes) between writing to a mirror file and writing to an original file, or vice versa, how long to permit a clean page to remain in buffer memory before eviction (e.g., based at least in part on a frequency of page modification and restraints on available buffer memory . . . ), and the like FIG. 8 is an illustration of a system 800 that facilitates data restoration at a page level via utilizing a data page mirroring technique, in accordance with an aspect of the subject invention. The system comprises an interface component 802 that is operatively associated with a data store 804 and a mirroring component 806, which comprises a recovery component 816, a lazy writer 818, a checkpoint component 820, and a restore component 822, which provide data restore functionality as described with regard to previous figures. The data store 804 comprises an original database 808 that stores original versions of data pages, a mirror database 810 that stores mirrored versions of data pages, and volatile memory 812 that maintains modified page versions prior to writing to at least one of the original database 808 and the mirror database 810. A monitoring component 814 can detect corrupt data in one or more pages via continuously and/or periodically employing a checksum technique. Additionally, the system 800 comprises a processor 824, a memory 826, and an AI component 828, as detailed supra with regard to FIG. 7.

A management component 830 is illustrated that is operatively coupled to the data store 804 and/or each of the components 808, 810, and 812 thereof and to the mirror component 806. It will be appreciated that the management component 830 can be operatively associated with any and all of the components and/or memories/databases of the system 800. The management component 830 facilitates generating and maintaining transaction logs for each page in the original database, in conjunction with the checkpoint component 820 and/or the system 800. For example, upon a detected modification and/or update to a data page from the interface component 802, the management component 830 can initiate a transaction log for the data page to be modified, in which all updates related to the data page can be recorded and assigned an LSN. At predetermined intervals, the checkpoint component 820 can read the original page version and the mirrored page version to determine whether both pages are identical, and if identical, the management component can truncate the transaction log for the page and initiate a new transaction log. Upon a system restore procedure, a version of the page can be restored that is associated with a most recent checkpoint, and the transaction log for the page can be read from the checkpoint forward to update the page according to any modifications recorded after the most recent checkpoint. In this manner, the restored page will comprise current information as of the time of the failure that prompted the restore action.

Figure 9:
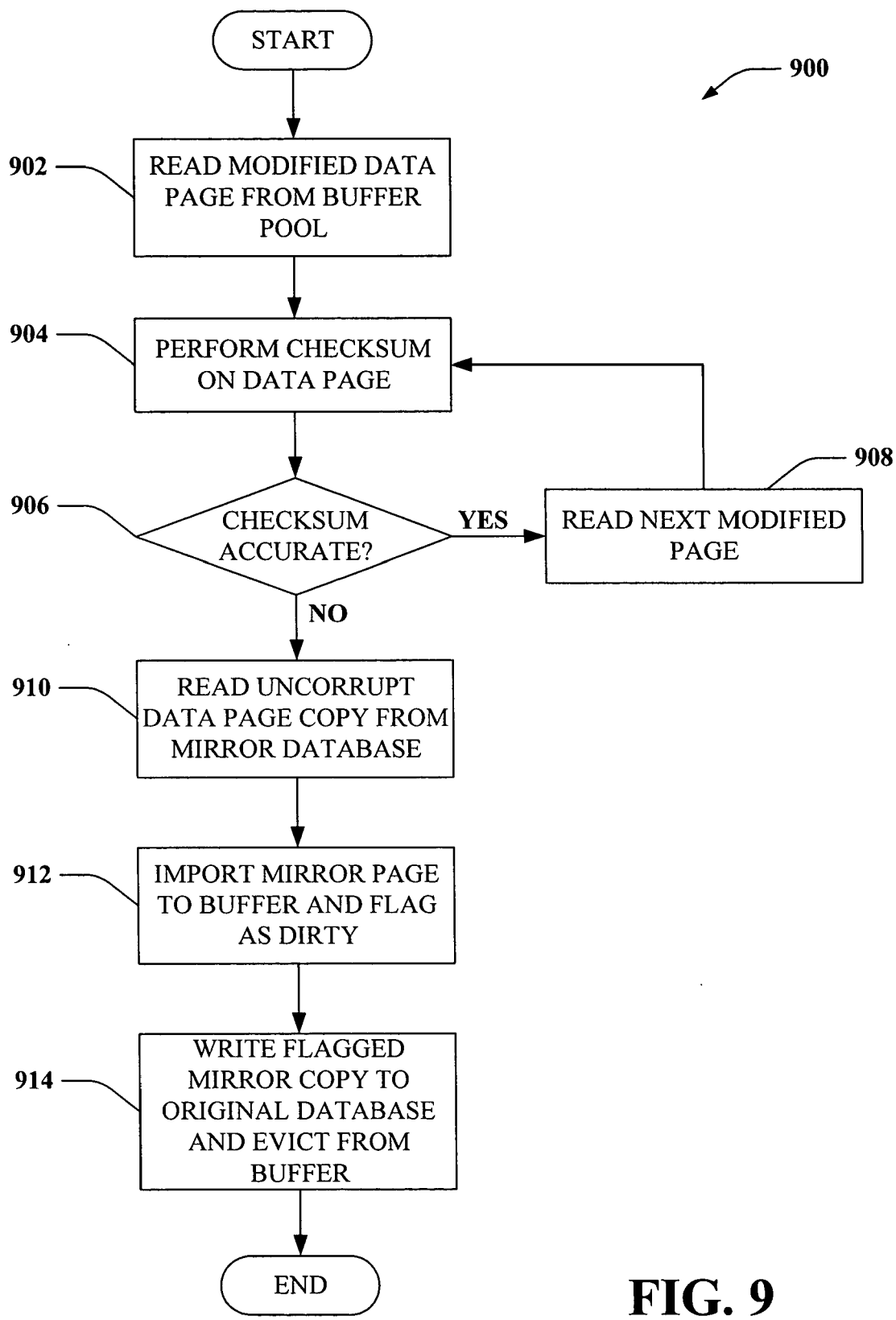
FIG. 9 is an illustration of a methodology for restoring data pages in a data file using a mirroring technique, in accordance with an aspect of the subject invention.
Figure 10:
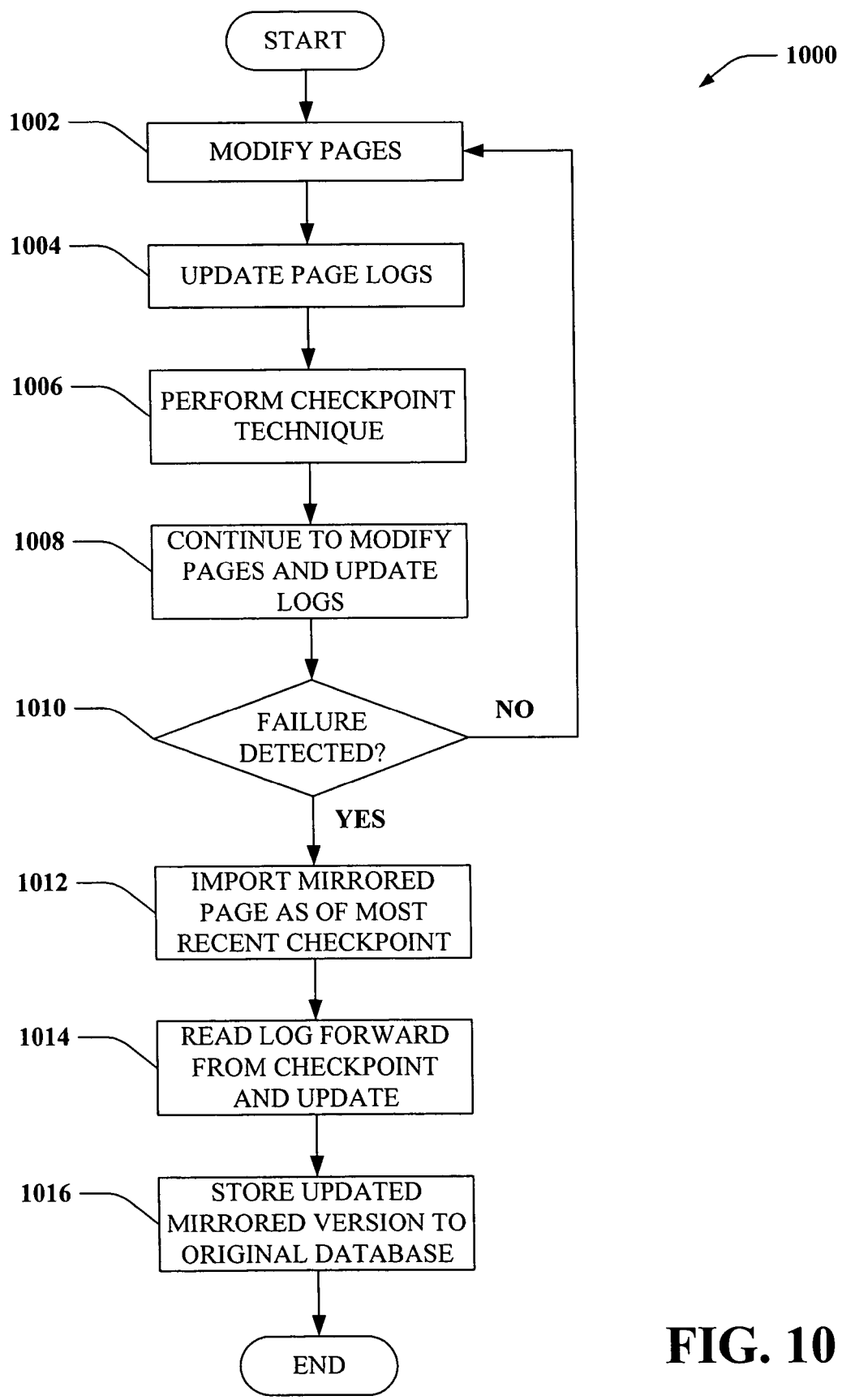
FIG. 10 is an illustration of a methodology for providing data backup and restore functionality using a structured query language data mirroring technique and employing transactional logs that record update events to a data page, in accordance with an aspect of the subject invention.
Figure 11:
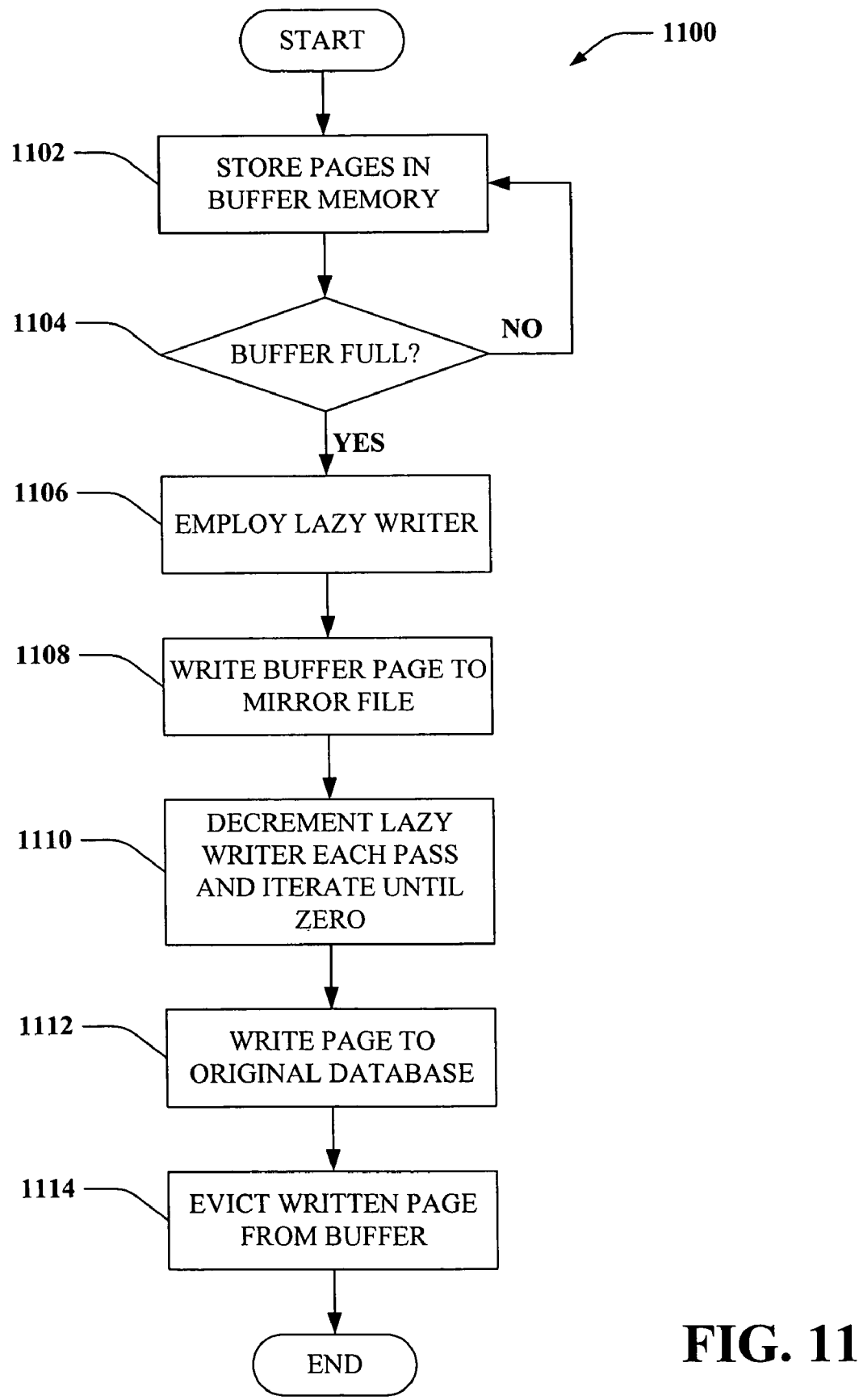
FIG. 11 is an illustration of a methodology for sequentially writing to each of a mirror database and an original database in order to generate dual page copies to facilitate providing data backup and restore functionality, in accordance with an aspect of the subject invention.

With reference to FIGS. 9-11, there are illustrated flowcharts in accordance with aspects of the with the subject invention. While, for purposes of simplicity of explanation, the one or more methodologies shown herein, e.g., in the form of flow charts, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Referring now to FIG. 9, there is illustrated a methodology 900 for restoring data pages in a data file using a mirroring technique, in accordance with an aspect of the subject invention. At 902, a data page can be read from a database through a buffer pool. A checksum technique can be performed on the page to determine whether corruption has occurred within the page, at 904. At 906, a determination can be made regarding whether the checksum is accurate (e.g., whether a value derived thereby is consistent with an expected value for the data page). If the checksum indicates that the data page is not corrupt, then at 908, a next data page can be read through the buffer pool and the method can revert to 904 to perform a checksum on the new page. If the checksum indicates that the page has experienced a corruption event, then at 910, a validated mirrored page image can be read form a mirror file. The mirror image of the page can be imported to the buffer pool, at 912, and marked as dirty to force a lazy writer to assess the page on a next pass through the buffer pool. At 914, the lazy writer can write data represented by the mirror image to its corresponding page location in an original data file to place page images in a clean state (e.g., as detailed supra with regard to previous figures). The lazy writer can evict the page from the buffer pool to free space therein upon achieving a clean state by writing to the originals file. The method 900 can thus be performed to restore corrupt data pages in an efficient manner that is transparent to a user.

FIG. 10 is an illustration of a methodology 1000 for providing data backup and restore functionality using a structured query language data mirroring technique and employing transactional logs that record update events to a data page, in accordance with an aspect of the subject invention. At 1002, a data page can be modified, such as by a user. A transactional log associated with the data page can be updated, at 1004, to reflect a recording of the modification (e.g., a log sequence number can be assigned to the update event and recorded in the log). At 1006, a checkpoint algorithm can be employed to flush all modified (e.g., dirty) buffer pages to disk. Once the checkpoint has been completed, the transaction log for the page is truncated and a new log segment can be initiated that represents a modification history for the data page from the checkpoint forward in time. Thus, at 1008, a subsequent page modification can be performed on the page and recorded in the log accordingly. At 1010, a determination can be made regarding whether a failure event has occurred. If no failure event is detected, at 1010, then the method can revert to 1002 for further iterations of page update, log transactions, and checkpoint procedures.

If it is determined at 1010 that a failure event has occurred, then at 1012, recovery can be initiated, which can comprise importing a mirror page image of the data page from a mirror file, where the mirror page is current up to the most recent checkpoint performed on the data page (e.g., at each checkpoint, the data page is written to the mirror file). The mirror page can be updated according to the transaction log from the checkpoint forward to bring the mirror page up to a current status as of the failure event, at 1014. Once the mirror page has been updated, it can be written to the original file, at 1016. For example, the updated mirrored image can be marked as dirty to induce a lazy writer to write to the original file to permit eviction of the page from a buffer pool. It will be appreciated that, in the event that the original image of the data page is more recent than the mirrored image (e.g., no log transaction is extant subsequent to the most recent checkpoint for the page), then a flag can be set in the page header to indicate such, in which case the mirror page image can be updated to be synchronous with the original page image, as detailed supra.

FIG. 11 is an illustration of a methodology 1100 for sequentially writing to each of a mirror database and an original database in order to generate dual page copies to facilitate providing data backup and restore functionality, in accordance with an aspect of the subject invention. According to the methodology 1100, pages can be stored to a buffer pool (e.g., volatile memory . . . ) as they are modified, at 1102. At 1104, a determination can be made regarding whether buffer memory has been saturated. If buffer memory is not occupied at or above a predetermined threshold, then the method can revert to 1102.

If buffer memory is determined to be at or near saturation, at 1104, then a lazy writer algorithm can be triggered, as indicated at 1106. The lazy writer can determine that one or more pages require eviction from the buffer pool in order to create free space for incoming modified pages. Prior to page eviction, such pages can be written to disk. The lazy writer can determine, for example, that a clean page that has not been used and/or modified for a predefined minimum period is a candidate for eviction and can evict such clean pages to make buffer space available. With regard to modified pages, the lazy writer can continually scan the buffer pool and can identify modified pages. Upon such identification, the lazy writer can write the modified page to a first file, such as a mirror file, at 1108. Writing to disk can occur sequentially with regard to two different data files (e.g., a mirror file and an original file . . . ) to facilitate maintaining two copies of data pages. The lazy writer can be associated with a counter that is decremented upon completion of each pass over a given page in the buffer pool, and the lazy writer can be decremented, at 1110. When the lazy writer is decremented to zero for a given page, it can be triggered to write the data page to an original data file, at 1112. Writing the page at 1112 can be triggered because the zero value for the page also triggers eviction of the page, at 1114, and the page is written to the original database prior to eviction from the buffer pool.

It is to be appreciated that the counter associated with the lazy writer can be set to a predefined maximum value from which it can be decremented for each pass of a page in the buffer pool. For example, a count value of eight can cause the lazy writer to pass a page nine times after writing the page to its associated mirror file before a zero count value is attained for the page, upon which the page will be written to the original file to which it corresponds and evicted from the buffer memory until subsequent modification. The counter can be associated with a timer such that count values and clock speed can be predefined and/or adjusted to facilitate mitigating substantial delay between writing to respective files, while reconciling a given desire to permit sufficient time to pass between file writes, should one arise.

Figure 12:
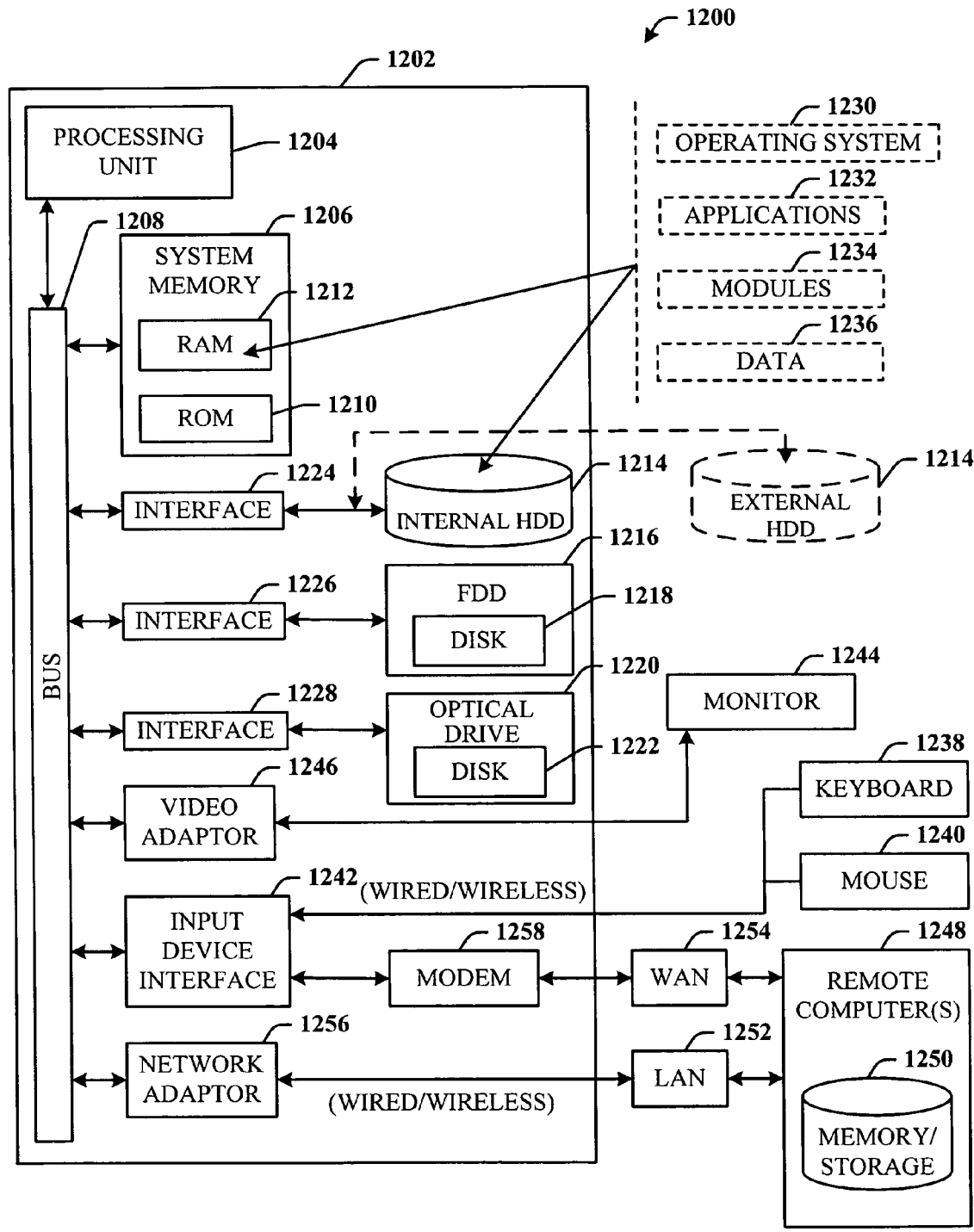
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the subject invention, FIG. 12 and the following discussion are intended to provide a brief, general description of a suitable computing environment 1200 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, there is illustrated an exemplary environment 1200 for implementing various aspects of the invention that includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the subject invention can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256. When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
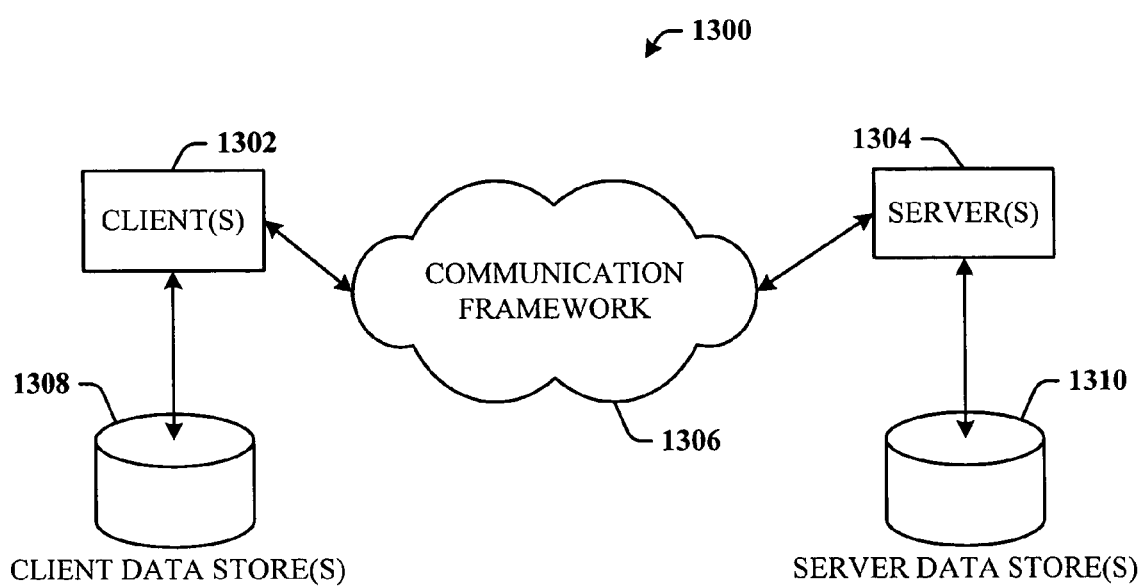
FIG. 13 illustrates a schematic block diagram of an exemplary computing environment in accordance with the subject invention.

Referring now to FIG. 13, there is illustrated a schematic block diagram of an exemplary computing environment 1300 in accordance with the subject invention. The system 1300 includes one or more client(s) 1302. The client(s) 1302 can be hardware and/or software (e.g., threads, processes, computing devices). The client(s) 1302 can house cookie(s) and/or associated contextual information by employing the subject invention, for example. The system 1300 also includes one or more server(s) 1304. The server(s) 1304 can also be hardware and/or software (e.g., threads, processes, computing devices). The servers 1304 can house threads to perform transformations by employing the subject invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An automatic data backup system that facilitates generating mirror copies of data pages, the system comprising:
    a processor;
    system memory;
    a data store comprising:
        an original database, a first instance of a first data page being located in the original database;
        a mirror database that is a complete backup of the original database, a second instance of the first data page being located in the mirror database; and
        a buffer memory, a plurality of data pages being located in the buffer memory, each of the plurality of data pages having an individually associated counter, the plurality of data pages in the buffer memory including a third instance of the first data page; and
    a mirroring component that, in response to a modification of the third instance of the first data page in the buffer memory, replaces the second instance of the first data page in the mirror database with the modified third instance of the first data page, and initializes a counter associated with the modified third instance of the first data page in the buffer memory; and utilizes a flush sequence number technique to maintain an I/O latch on the instances of the first data page for a duration of a single I/O write, the mirroring component including:
        a checkpoint component that generates a transaction log comprising recorded modification events for each modified data page and a log sequence number assigned to each page update, and truncates the transaction log for the data page upon the checkpoint and initiates a new transaction log for the data page; and
        a lazy writer component that repeatedly passes over the plurality of data pages in the buffer memory, that incrementally adjusts each of the counters individually associated with the plurality of data pages in the buffer memory after each pass over, and that, in response to the counter associated with the third instance of the first data page in the buffer memory reaching a predetermined value after being incrementally adjusted, replaces the first instance of the first data page in the original database with the modified third instance of the first data page and then evicts the third instance of the first data page from the buffer memory.

2. The system of claim 1, further comprising:
    a monitoring component that determines whether data in a data page has been corrupted; and
    a restore component that restores the data page according to a stored mirror image of the data page in the mirror database.

3. The system of claim 2, the monitoring component employs a checksum technique to determine whether the data page has been corrupted.

4. A computer-implemented method of fully and automatically backing up a database, the method comprising:
    detecting a modification for a data page in an original data file;
    loading the data page into a buffer memory, a plurality of data pages being located in the buffer memory, each of the plurality of data pages having an individually associated counter;
    assigning a flush sequence number (FSN) to the modification;
    applying the modification to the loaded data page in buffer memory to generate a modified data page;
    generating a transaction log;
    recording page modification events for the modified data page in the transaction log;
    recording the FSN for the modification to in the transaction log;
    writing the modified data page to a mirror data file as a mirrored data page;

writing the mirror data page to disk when the FSN is less than or equal to a most recent FSN;

setting the FSN for the modification equal to the most recent FSN subsequent to writing the modified data page to the mirror data file on disk;

verifying that the modified data page has been mirrored and that the FSN is less than or equal to the most recent FSN, subsequent to setting the FSN for the modification;

acquiring an input/output latch for the page upon verification;

initializing a counter for the modified data page;

executing a plurality of passes over the plurality of data pages in the buffer memory, each of the counters individually associated with the plurality of data pages in the buffer memory being incrementally adjusted as part of each pass;

in response to the counter associated with the modified data page reaching a predetermined value after being incrementally adjusted during one of the plurality of passes, writing the modified data page to the original data file;

evicting the modified data page from the buffer memory after writing the modified data page to the original data file;

releasing the input/output data latch; and periodically performing a checkpoint event that flushes a plurality of modified data pages in the buffer memory to disk, truncates the transaction log for each modified data page, and initiates a new transaction log for each data page modified after the checkpoint operation, the transaction logs are delimited by checkpoint events.

5. The computer-implemented method of claim 4, further comprising:

employing a checksum technique to detect a corrupt data page in the original data file; and reading a mirrored page into the buffer memory from the mirror data file, the mirrored page corresponds to the corrupt data page in the original data file upon detection of the corrupt data page.

6. The computer-implemented method of claim 5, further comprising:

setting a flag in a header of the mirrored page to mark the mirrored page as having been modified; and writing the flagged mirrored page to the original data file when the flagged mirrored page is evicted from the buffer memory.

7. The computer-implemented method of claim 4, further comprising detecting a system failure event and initiating data recovery upon detection of the system failure event.

8. The computer-implemented method of claim 7, further comprising identifying a most recent valid checkpointed data page for each page in the data file and importing the checkpointed data page into the buffer memory.

9. The computer-implemented method of claim 8, further comprising modifying the checkpointed data page according to modification events recorded in the transaction log for the data page from the checkpoint forward to make the data page current as of the failure event.

10. The computer-implemented method of claim 4, further comprising determining a status of images of the data page in each of the buffer memory, the mirror data file, and the original data file, the status indicates which of the images is most recent with regard to the other images of the data page.

11. The computer-implemented method of claim 10, data page images comprise a buffer image (V), a first database image (M), and a second database image (O), where page status is defined by one of the following temporal relationships with ">" indicating a more recent image and "=" indicating identical images:

1) V=O=M
2) V>M=O OR V>O>M
3) V=M>O
4) V>M>O
5) V=O>M.

12. The computer-implemented method of claim 11, the modified data page is written from the buffer memory to the mirror data file occurs when page status is one of a second status and a fifth status, and to the original data file when the status is one of a third status and a fourth status.

13. A computer-readable storage medium having stored thereon one or more computer-executable instructions that, when executed by one or more processors, perform a method of fully and automatically backing up a database, the method comprising:

detecting a modification for a data page in an original data file;

loading the data page into a buffer memory, a plurality of data pages being located in the buffer memory, each of the plurality of data pages having an individually associated counter;

assigning a flush sequence number (FSN) to the modification;

applying the modification to the loaded data page in buffer memory to generate a modified data page;

generating a transaction log;

recording page modification events for the modified data page in the transaction log;

recording the FSN for the modification in the transaction log;

writing the modified data page to a mirror data file as a mirrored data page;

writing the mirror data page to disk when the FSN is less than or equal to a most recent FSN;

setting the FSN for the modification equal to the most recent FSN subsequent to writing the modified data page to the mirror data file on disk;

verifying that the modified data page has been mirrored and that the FSN is less than or equal to the most recent FSN, subsequent to setting the FSN for the modification;

acquiring an input/output latch for the page upon verification;

initializing a counter for the modified data page;

executing a plurality of passes over the plurality of data pages in the buffer memory, each of the counters individually associated with the plurality of data pages in the buffer memory being incremented or decremented as part of each pass;

in response to the counter associated with the modified data page reaching a predetermined value after being incremented or decremented during one of the plurality of passes, writing the modified data page to the original data file;

evicting the modified data page from the buffer memory after writing the modified data page to the original data file;

releasing the input/output data latch; and periodically performing a checkpoint event that flushes a plurality of modified data pages in the buffer memory to disk, truncates the transaction log for each modified data page, and initiates a new transaction log for each data page modified after the checkpoint operation, the transaction logs are delimited by checkpoint events.

14. The computer-readable storage medium of claim 13, wherein the method further comprises:
- employing a checksum technique to detect a corrupt data page in the original data file; and
- reading a mirrored page into the buffer memory from the mirror data file, the mirrored page corresponds to the corrupt data page in the original data file upon detection of the corrupt data page.

15. The computer-readable storage medium of claim 14, wherein the method further comprises:
- setting a flag in a header of the mirrored page to mark the mirrored page as having been modified; and
- writing the flagged mirrored page to the original data file when the flagged mirrored page is evicted from the buffer memory.

* * * * *